US012259364B2

(12) United States Patent  (10) Patent No.: US 12,259,364 B2
Perkins  (45) Date of Patent: Mar. 25, 2025

(54) STRAIN TESTING RIG AND METHOD OF EVALUATING STRAIN CHARACTERISTICS OF SPECIMEN

(71) Applicant: Bayou Holdco, Inc., Houston, TX (US)

(72) Inventor: Randall Perkins, Houston, TX (US)

(73) Assignee: Bayou Holdco, Inc., Houston, TX (US)

( * ) Notice: Subject to any disclaimer, the term of this patent is extended or adjusted under 35 U.S.C. 154(b) by 403 days.

(21) Appl. No.: 17/675,939

(22) Filed: Feb. 18, 2022

(65)  Prior Publication Data

US 2023/0266215 A1  Aug. 24, 2023

(51) Int. Cl.
G01N 3/04  (2006.01)
G01N 3/08  (2006.01)
G01N 3/10  (2006.01)
G01N 3/20  (2006.01)

(52) U.S. Cl.
CPC ............. G01N 3/04 (2013.01); G01N 3/08 (2013.01); G01N 3/10 (2013.01); G01N 3/20 (2013.01); G01N 2203/0048 (2013.01); G01N 2203/0264 (2013.01); G01N 2203/0282 (2013.01); G01N 2203/04 (2013.01)

(58) Field of Classification Search
CPC .. G01N 3/04; G01N 3/08; G01N 3/10; G01N 3/20; G01N 2203/0282; G01N 2203/04; G01N 2203/0048; G01N 2203/0264
See application file for complete search history.

(56)  References Cited

U.S. PATENT DOCUMENTS 10,316,993 B2  6/2019  Mueller et al.

FOREIGN PATENT DOCUMENTS

| CN | 203858162 U | 10/2014 |
| CN | 205192869 U | 4/2016 |
| CN | 104502089 B | 2/2017 |
| CN | 106113474 A | 1/2018 |

(Continued)

OTHER PUBLICATIONS

Moradian et al. "Durability and Dimensional Stability of Steel Fiber Reinforced Cementitious Mortar in Comparison to High Performance Concrete", Asian Journal of Civil Engineering (BHRC) vol. 17, No. 4 (2016) pp. 515-535 <https://ajce.bhrc.ac.ir/Volumes-Issues/agentType/View/PropertyID/6869> (Year: 2016).*

(Continued)

Primary Examiner — Jonathan M Dunlap
(74) Attorney, Agent, or Firm — Stinson LLP

(57)  ABSTRACT

A strain testing rig for an elongate specimen has a first grip for the first end portion of the specimen, a second grip for the second end portion of the specimen, and a drive mechanism for moving the first grip away from the second grip to stretch the specimen lengthwise. The first grip and the second grip are configured to maintain a grip on the specimen as the cross section of the specimen decreases during stretching. Each of the first grip and the second grip can include a tapered dog, a press for compressing the respective end portion of the specimen, and a clamp for clamping the respective end portion of the specimen in a direction perpendicular to the action of the clamp. A method of testing strain characteristics can involve using digital image correlation to separately measure strain on each of the at least three independent strain zones.

17 Claims, 13 Drawing Sheets

(56) References Cited

FOREIGN PATENT DOCUMENTS

| CN | 207197911 U | | 4/2018 |
|---|---|---|---|
| CN | 106500900 B | | 11/2018 |
| CN | 109848329 A | | 6/2019 |
| CN | 208936940 U | | 6/2019 |
| CN | 106840913 B | | 8/2019 |
| CN | 110082193 A | * | 8/2019 |
| CN | 107610926 B | | 10/2019 |
| CN | 110961497 A | | 4/2020 |
| CN | 115078119 A | * | 9/2022 |

OTHER PUBLICATIONS

Testresources, Flexure Test of Insulation Materials, www.linkedin.com/company/testreseources, Jun. 30, 2020, 7 pages.

Meiwes, Cristoph et al., Full-Scale Reeling Tests of HFI Welded Line Pipe for Offshore Reel-Laying Insulation, Proceedings of the 2014 10th International Pipe Conference, Oct. 3, 2014, 7 pages.

* cited by examiner

STRAIN TESTING RIG AND METHOD OF EVALUATING STRAIN CHARACTERISTICS OF SPECIMEN

FIELD

This disclosure generally pertains to a strain testing rig and methods of evaluating strain characteristics of a specimen using such a rig.

BACKGROUND

Metal pipes are often insulated to promote the efficient transport of hydrocarbons through the pipes in harsh environments. For example, temperatures on the ocean floor at significant depths are very cold. The loss of heat from the pipe to the ocean water can cause the oil (or other hydrocarbon) to deposit hydrates, waxes, and asphaltenes within the pipe. These can lead to reduced flow and even plugging of the pipe. It is known to insulate pipes in an injection molding process prior to deployment. Injection molded insulated pipes can be used, for example, in subsea oil and gas pipelines or risers. On the other hand, some extracted hydrocarbons can be at u7 extremely high temperatures which are deleterious to the insulation material. Some subsea oil and gas environments require pipes that can withstand temperatures of 350° F. or more.

There is a recognized a need to increase the maximum operating temperatures of insulated pipes used in subsea oil and gas pipelines or risers. To that end, industry is developing new high-temperature polymers that can be used in molding systems of the type disclosed in U.S. Patent Application Publication No. 2017/0355114 (hereby incorporated by reference in its entirety) to form high temperature insulation on pipes. However, for a new high-temperature polymer to be successfully deployed, it must meet not only the temperature requirements of a given application, but also the often strenuous mechanical requirements. For instance, offshore pipes are usually "reeled," which is the process by which pipes are wound around very large, ship-bound spools in a way similar to winding a thread onto a sewing spool. The reeling process imparts significant tension and bending stress on insulated pipes, and it is important for a purchaser of such pipes to have confidence that the insulation material can withstand the reeling operation without material failure.

In the past, four-point bend testing rigs have been used to test coated pipes to evaluate their suitability for reeling. Such bend testing rigs are configured to push the middle portion of an insulated pipe supported at its ends in a direction normal to the pipe axis. This causes the pipe to bend. The industry once believed that this bending simulates the bending that occurs as straight insulated pipe is wound onto a large round reel. But over time, the industry began to notice that materials adjudged to be suitable for reeling based on four-point bend tests would too frequently fail when reeled in a field application. It was determined that the four-point bending tests do not adequately test suitability for reeling because they do not stretch the sample in tension as occurs with pipes used in reeling applications.

Accordingly, a different "full scale reel-test rig" has been developed for assessing reeling suitability and has been widely adopted by the industry. In this test rig, a first end portion of a full-scale insulated pipe is secured in a clamp so that the remainder of the insulated pipe is cantilevered from the first end portion. A drive mechanism is then coupled to the opposite second end portion of the insulated pipe. The drive mechanism is specially designed to simultaneously bend and stretch the insulated pipe in axial tension. These types of full-scale field tests have proven to be more predictive than the four-point bending tests used in the past.

SUMMARY

In one aspect, a strain testing rig for testing an elongate specimen having a first end portion and a second end portion spaced apart along an axis comprises at least three restraints arranged to be spaced apart along the axis of the elongate specimen. Each of the restraints is configured to engage the elongate specimen at a respective contact location such that the strain testing rig defines an independent strain zone between each pair of adjacent contact locations. Each independent strain zone has a length along the axis. A drive mechanism is configured to move the at least three restraints to stretch each independent strain zone such that the length of each independent strain zone along the axis increases.

In another aspect, a method of strain testing an elongate specimen comprises engaging a plurality of restraints with the elongate specimen at respective contact locations spaced apart along a length of the elongate specimen. Each of the plurality of restraints is moved to simultaneously increase a length of at least two independent strain zones. Each independent strain zone is located between an adjacent pair of contact locations.

In another aspect, a strain testing rig for testing an elongate specimen having a first end portion and a second end portion spaced apart along an axis comprises a base. A chain linkage is supported on the base. The chain linkage comprises a plurality of chain link restraints pivotably connected end-to-end. The chain linkage has a first end portion, a second end portion, and a length extending from the first end portion to the second end portion. The chain linkage has a longitudinal forward facing side configured to oppose the elongate specimen such that, on the longitudinal forward facing side of the chain linkage, each chain link restraint engages the specimen at a respective location along the axis. A driver is connected to the chain linkage for driving the chain linkage through a range of motion with respect to the base. The range of motion includes a first position in which the forward facing side of the chain linkage is substantially straight and a second position in which the forward facing side of the chain linkage is convexly curved.

In one aspect, a strain testing rig for testing an elongate specimen having a first end portion and a second end portion spaced apart along a specimen axis and a length extending from the first end portion to the second end portion along the specimen axis comprises a first grip for gripping the first end portion of the specimen, a second grip for gripping the second end portion of the specimen, and a drive mechanism configured to move the first grip away from the second grip to stretch the specimen lengthwise. The first grip and the second grip are configured to maintain a grip on the specimen as the cross section of the specimen decreases during stretching.

In another aspect, a strain testing rig for testing an elongate specimen having a first end portion and a second end portion spaced apart along a specimen axis and a length extending from the first end portion to the second end portion along the specimen axis comprises a first grip for gripping the first end portion of the specimen, a second grip for gripping the second end portion of the specimen, and a drive mechanism configured to move the first grip away from the second grip to stretch the specimen lengthwise. Each of the first grip and the second grip comprises a press for compressing the respective end portion of the specimen. Each press comprises a linear actuator and a press plate. The linear actuator is configured to drive the press plate to compress the respective end portion of the specimen.

In another aspect, a strain testing rig for testing an elongate specimen having a first end portion and a second end portion spaced apart along a specimen axis and a length extending from the first end portion to the second end portion along the specimen axis comprises a first grip for gripping the first end portion of the specimen, a second grip for gripping the second end portion of the specimen, and a drive mechanism configured to move the first grip away from the second grip to stretch the specimen lengthwise. Each of the first grip and the second grip comprises a clamp for clamping the respective end portion of the specimen along an X axis parallel to the specimen axis and a press for compressing the respective end portion of the specimen along a Y axis perpendicular to the X axis.

In another aspect, a method of testing strain characteristics comprises stretching the specimen such that such that strain on each of at least three independent strain zones of the specimen is substantially independent of strain on the remainder of the specimen and using digital image correlation to separately measure strain on each of the at least three independent strain zones.

Other aspects and features will be understood hereinafter.

BRIEF DESCRIPTION OF THE DRAWINGS

Corresponding reference characters indicate corresponding parts throughout the drawings.

DETAILED DESCRIPTION

Figure 1:
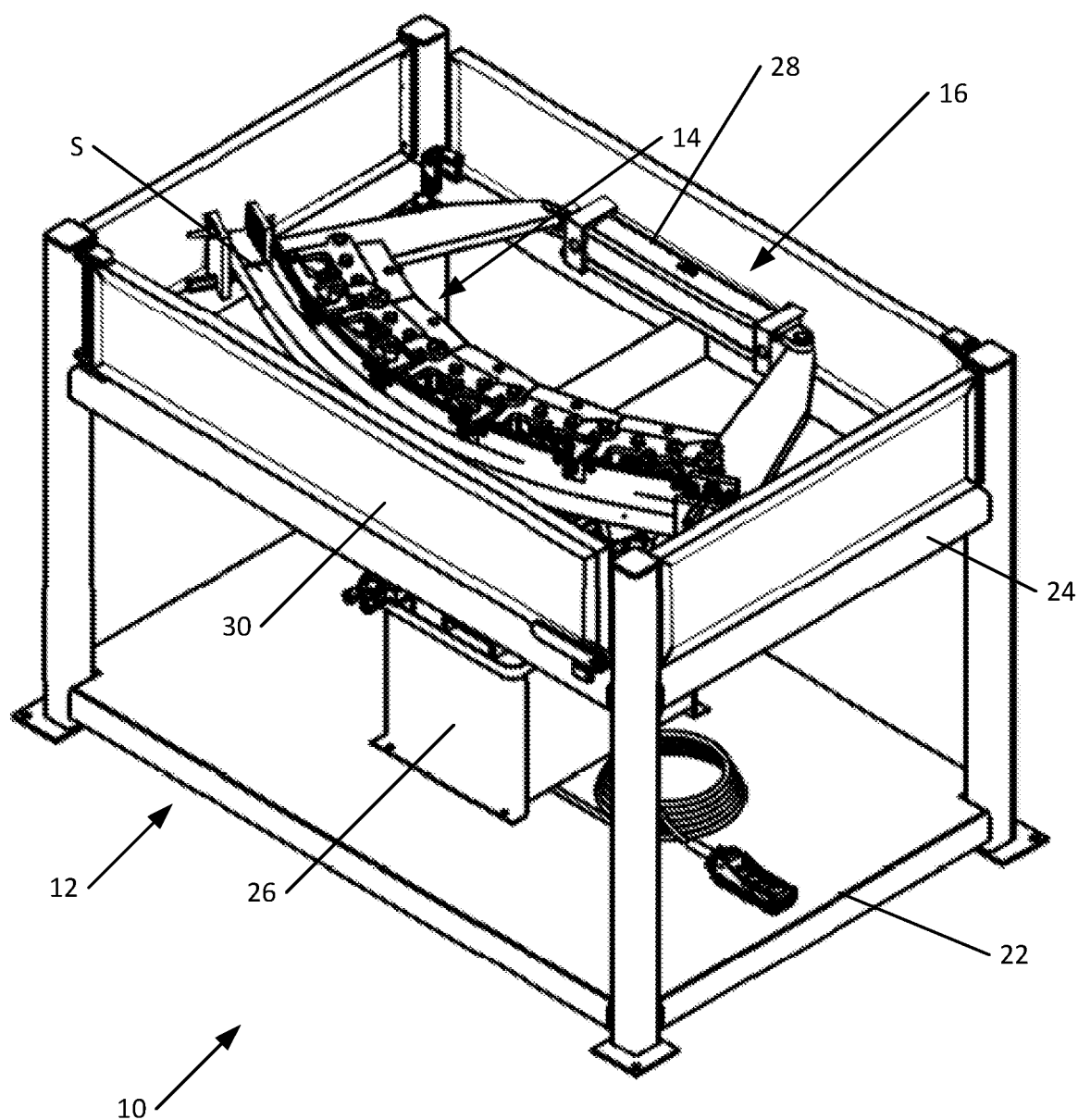
FIG. 1 is a perspective of a strain testing rig in the scope of this disclosure, illustrating the strain testing rig in a position at which it deforms a specimen.

The inventors have recognized a need in the industry for a laboratory-scale test rig that can provide a useful indication of the suitability of a given material for reeling operations based on a relatively small specimen. The full-scale reel-test rig described above, while capable of providing a useful indication of suitability for reeling, requires a full-length insulated pipe to operate. In other words, a developer of materials must undertake the expense of forming a full-scale insulated pipe from the material of interest before it can make a reasonable assessment of the suitability of the material for reeling. This creates a substantial impediment to material development. The inventors have recognized that materials could be developed more efficiently it were possible to test a small-scale sample of material of interest without applying it to a pipe.

Current laboratory-scale testing solutions include conventional tensile test and three- and four-point bend test devices. The industry has attempted to assess the suitability of materials for reeling by testing small specimens on these types of conventional laboratory devices. However, the inventors have recognized that the results provided by existing laboratory devices do not provide a reliable indication of suitability for reeling. For example, materials that exhibit sufficient elongation at break when tested at lab scale will unexpectedly fail in the field. The inventors hypothesize that laboratory tests fail because they are designed to isolate stress to a small, well-defined area. The isolated strain effects do not scale to the very much larger applications of the material in the field. In field applications, weak points in the material are very likely to be present, but such weak points do not often manifest in current small-scale lab specimens. But during reeling, once this higher rate of strain begins to occur in a weaker region of the material, all yielding will take place in this weakened region. In effect, the properties of the material will be dictated by the weakest portion of the material, which is not subject to testing under current laboratory conditions.

Another complicating factor is that, in an insulated pipe, the relative straining of the insulation material is constrained by adherence to the underlying steel pipe. Localized variances in strain rates due to inconsistent material physical properties (ex: Porosity, poor mixing, curing variances) is limited by regional constraint. However, the pipe itself is prone to inconsistent strain rates due to variances in pipe wall thickness, metallurgical inconsistencies, and geometrical variances. The much stronger pipe distortions will dictate distortions in the insulation.

In view of all this, the inventors have concluded that useful laboratory-scale testing of materials for suitability for reeling requires an apparatus that can simulate and contain localized distortions that occur as a larger material specimen is stressed. As explained more fully below, this disclosure provides a strain testing rig that is configured to stretch elongate specimens, e.g., specimens of about 1 foot to about 8 feet in length (e.g., from about 3 feet (0.91 m) to about 4 feet (1.22 m) and having a cross-sectional area from about 2 in$^2$ (13 cm$^2$) to about 36 in$^2$ (232 cm$^2$) (e.g., from about 8 in$^2$ (51 cm$^2$) to about 20 in$^2$ (52 cm$^2$)). Further the strain testing rig is designed to mimic the way in which the steel pipe constrains the strain rate of the insulation material along the length of the pipe. More particularly, the strain rig discussed below is configured to constrain the elongate specimen to force the strain to occur somewhat evenly within discrete longitudinal zones along the length of the specimen, similar to the role of the pipe adhered to the insulation.

Referring to FIGS. 1-4, a strain testing rig for testing the strain characteristics of an elongate specimen S is generally indicated at reference number 10. The strain testing rig generally includes a base 12, a chain linkage 14 (broadly, a linkage) supported on the base for movement relative to the base through a range of motion, and a drive mechanism 16 connected to the linkage for driving the linkage through its range of motion. The chain linkage 14 is generally configured to engage the elongate specimen S so that the linkage deforms the specimen as the drive mechanism 16 drives the linkage through the range of motion. The illustrated linkage 14 comprises five links 20 that are pivotably connected end-to-end as a chain, although other numbers of links could be used. Each chain link 20 broadly forms a restraint that is configured to engage the specimen S at a respective contact location along the specimen axis A. In the illustrated embodiment, the strain testing rig 10 is configured to test specimens S having a minimum length of 3 feet (0.91 m) and cross-sectional dimensions of up to 3 inches-by-3 inches (8 cm by 8 cm). It will be understood however, that strain testing rigs could be configured to test specimens of other sizes without departing from the scope of the disclosure.

As explained more fully below, each chain link restraint 20 is configured to constrain a restrained portion RP of the specimen S at the respective line of contact (broadly, "contact location") such that the restrained portion moves conjointly with the restraint as the chain linkage 14 moves along its range of motion. This enables the strain testing rig 10 to define independent strain zones SZ along the specimen S, each having a length along the specimen axis A between each pair of adjacent restrained portions RP. As explained more fully below, as the drive mechanism 16 drives the linkage 14 through its range of motion from a first position (FIGS. 2 and 3) to a second position (FIGS. 1 and 4), the drive mechanism moves the restraints 20 to stretch each of the independent strain zones SZ such that a length of each independent strain zone along the specimen axis A increases. By constraining the longitudinally spaced restrained portions RP to the individual chain link restraints 20, the strain testing rig 10 can isolate the independent strain zones SZ so that the strain on each zone is largely independent of the strain on the remainder of the specimen. The inventors believe that this provides much more robust information about the strain characteristics of the specimen than conventional laboratory-scale strain testing methods in which a much smaller specimen is strained as one unit. Furthermore, the inventors believe that the strain information provided by the strain testing rig 10 can provide a much more reliable indication of the suitability of a material for reeling.

Further details about the structure of the illustrated strain testing rig 10 are provided below. However, it is contemplated that a strain testing rig can differ from the illustrated embodiment without departing from the scope and principles of the disclosure. Generally, strain testing rigs in the scope of this disclosure can have (i) at least three movable restraints for engaging an elongate specimen at respective lines of contact spaced apart along the longitudinal axis of the specimen and (ii) a drive mechanism configured to move the restraints in such a way as to stretch independent strain zones of the specimen extending along the longitudinal axis between the lines of contact so that the length of each independent strain zone increases. Although the illustrated embodiment uses a particular drive mechanism 16 (discussed below) and chain linkage 14 to force independent strain zones SZ to stretch at least somewhat independently, it is contemplated that other embodiments can provide other linkages and mechanisms for performing this function within the scope of this disclosure.

Referring to FIG. 1, in the illustrated embodiment, the base 12 comprises a lower platform 22 and an upper platform 24. The lower platform 22 supports a hydraulic system 26, and the upper platform 24 supports an assembly including the linkage 14 and the drive mechanism 16. In the illustrated embodiment, the upper platform 24 is configured to attach to the centermost chain link restraint 20 such that centermost chain link restraint 20 is fixed in place with respect to the base 12 and the remainder of the linkage 14 and the drive mechanism 16 is freely suspended from the centermost chain link restraint. The illustrated drive mechanism 16 comprise a hydraulic cylinder 28 (broadly, a linear actuator) that is powered by the hydraulic system 26. A safety fence 30 is positioned on the upper platform around the linkage 14 and the drive mechanism 16. Suitably, at least one portion of the safety fence 30 is selectively openable as a gate to allow a specimen S to be loaded onto, and unloaded from, the testing rig 10.

Figure 2:
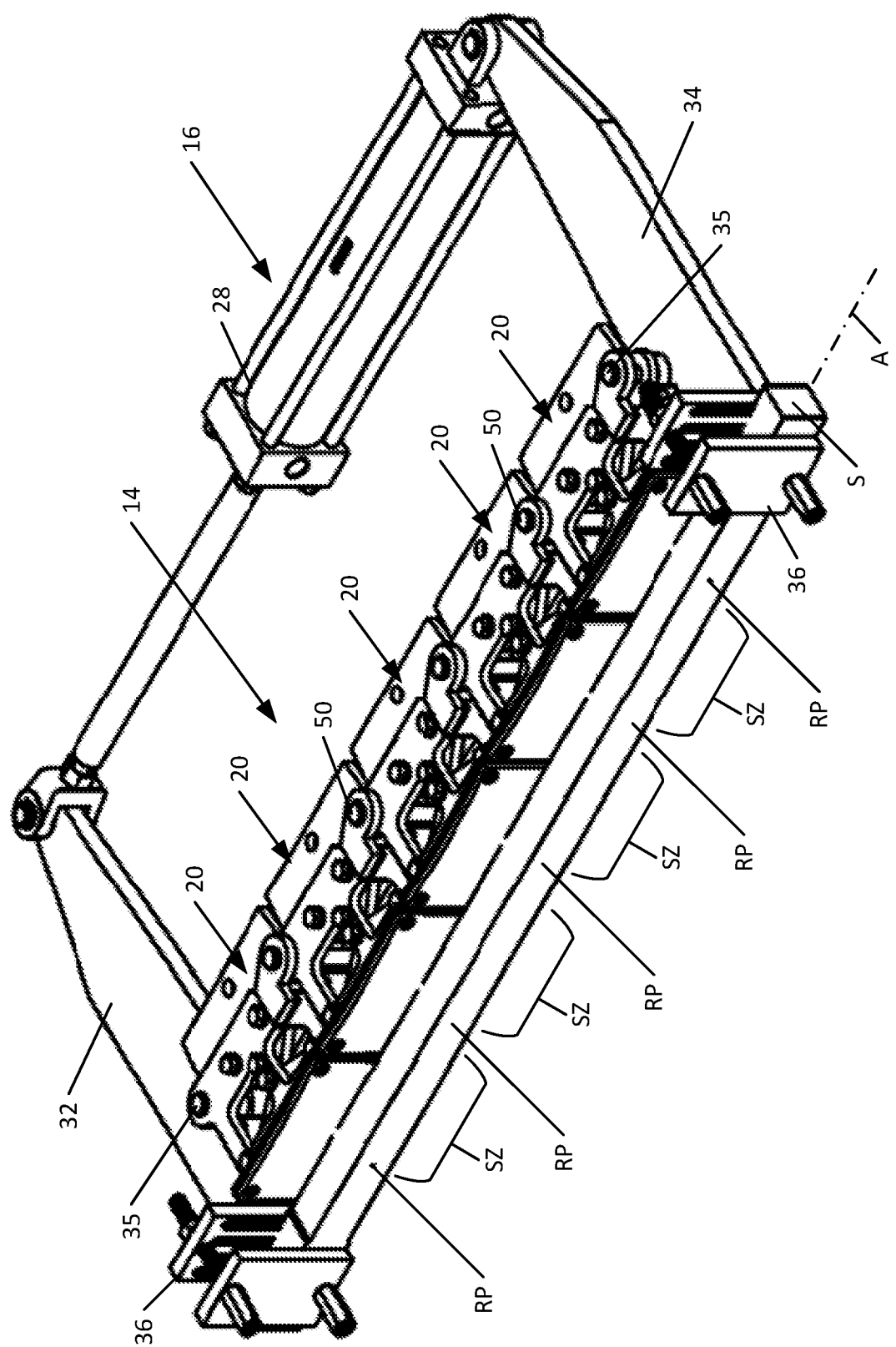
FIG. 2 is a perspective of a subassembly of the strain testing rig including a drive mechanism and a chain linkage, illustrating the subassembly in a position at which it holds the specimen without deforming the specimen.
Figure 3:
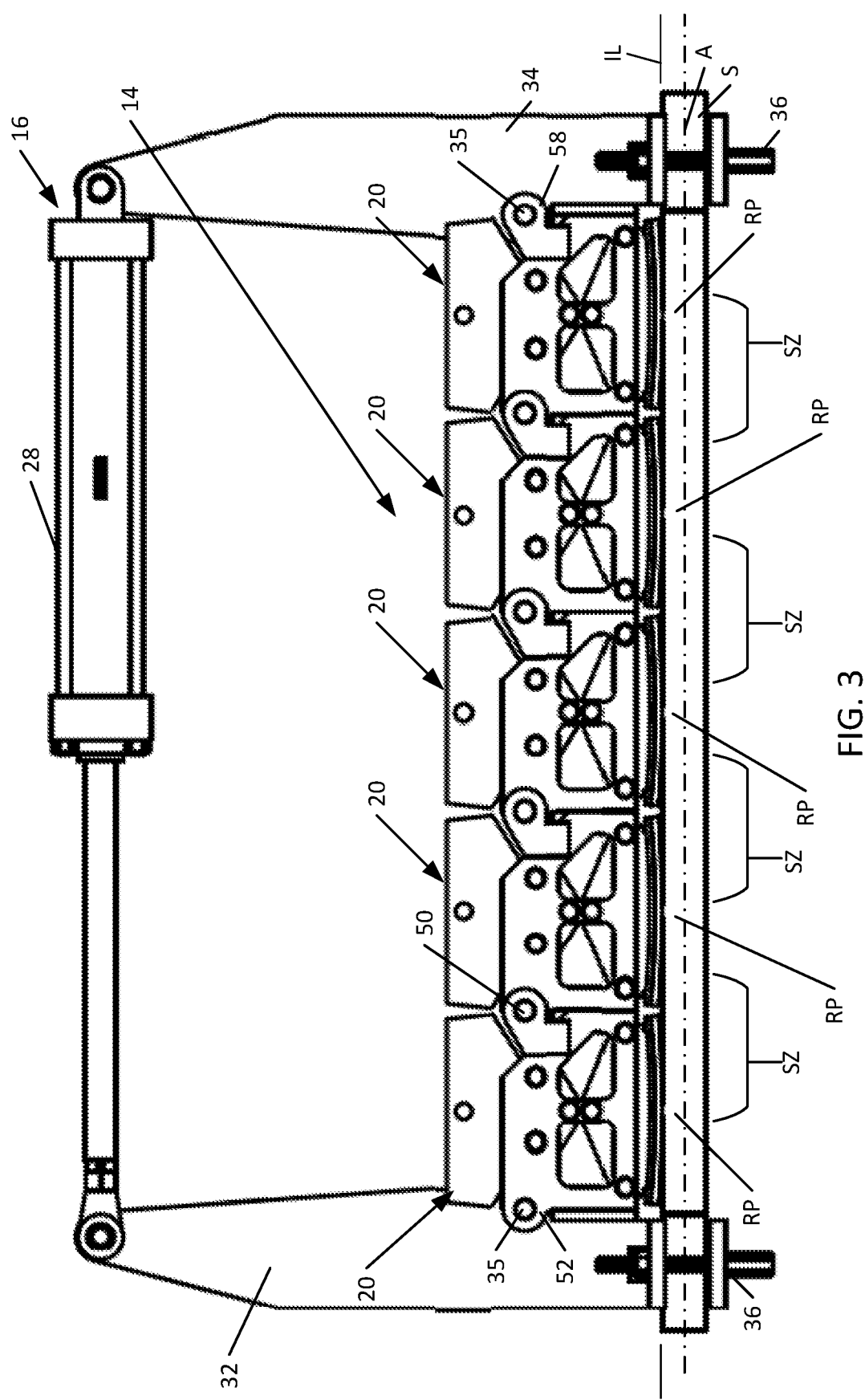
FIG. 3 is a top plan view of the subassembly of FIG. 2 in the position of FIG. 2.
Figure 4:
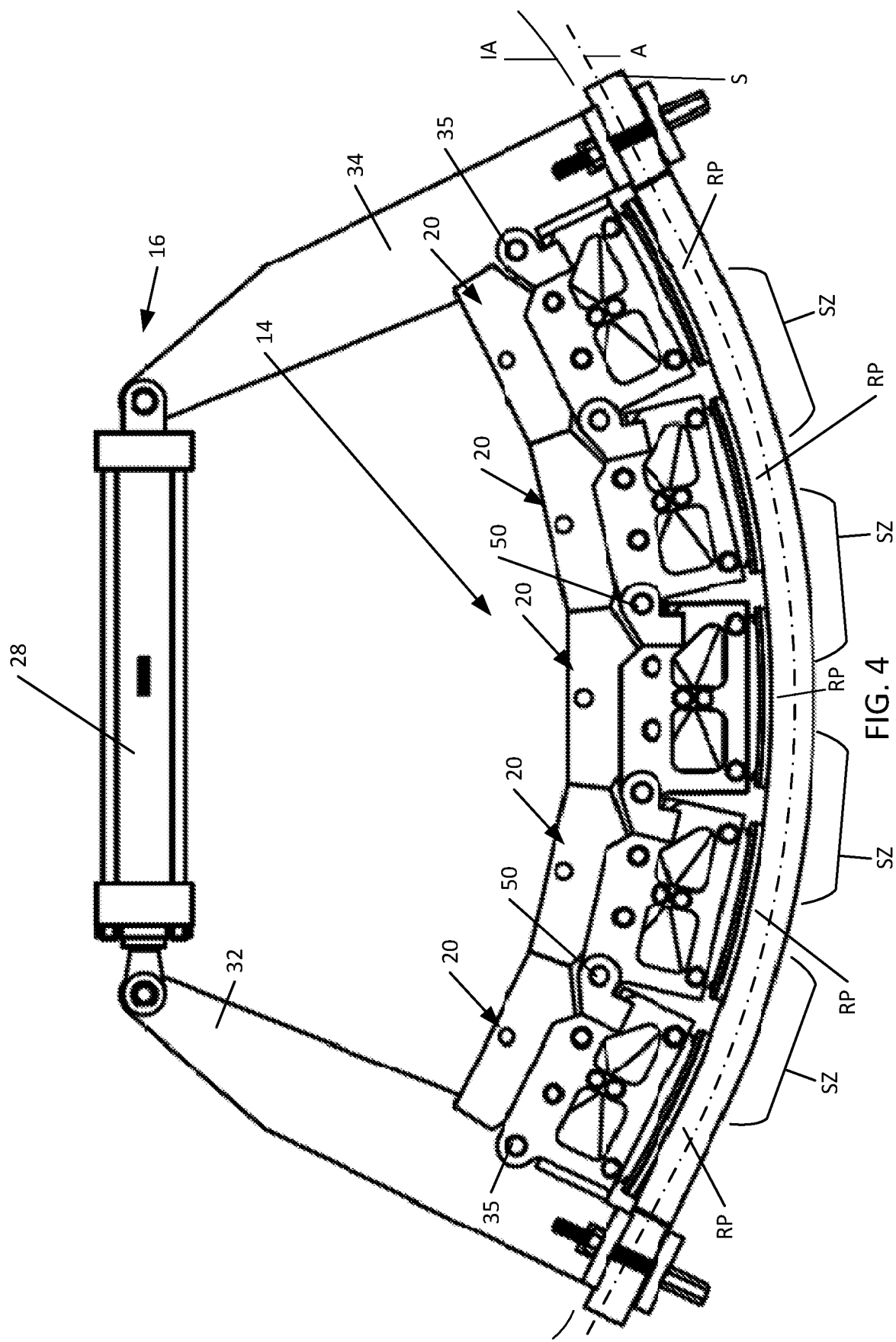
FIG. 4 is a top plan view of the subassembly of FIG. 2 in the position of FIG. 1.

Referring to FIGS. 2-4, in the illustrated embodiment, the drive mechanism 16 uses a single hydraulic cylinder 28 (broadly, a linear actuator, or more broadly still, a driver) to drive the entire linkage 14, e.g., to simultaneously drive movement of each individual chain link restraint 20. The illustrated drive mechanism 16 further comprises a first arm 32 and a second arm 34 on opposite ends of the hydraulic cylinder 28. Each arm 32 has a first end portion configured to couple to the specimen S as shown in the drawings and an opposite a second end portion that is pivotably connected to a respective end portion of the hydraulic cylinder 28. Each arm 32, 34 is pivotably connected to a respective one of the first and second end portions of the chain linkage 14 by a respective arm-to-chain pin 35 at a location along the arm spaced apart between the first and second end portions of the arm. In the illustrated embodiment, the first end portion of each arm 32, 34 comprises a specimen clamp 36. Each specimen clamp 36 is configured to clamp onto a respective end portion of the specimen S to constrain the respective end portion to move conjointly with the clamp when the hydraulic cylinder 28 moves the arms.

As explained above, the illustrated linkage 14 comprises a chain linkage, with each restraint 20 forming a pivoting link along the chain. The illustrated chain linkage 14 comprises five chain link restraints 20, which are configured to define four independent strain zones SZ along the specimen S. However, it will be understood that other chain linkages can comprise other numbers of restraints pivotably connected together end-to-end to form a chain. It is particularly contemplated, that chain linkages in the scope of this disclosure can comprise at least three restraints for defining at least two independent strain zones along the specimen. Accordingly, in certain embodiments, the chain linkage has from three to nine restraints. The chain linkage 14 has a first end portion (shown at left in FIGS. 1-4), a second end portion (shown at right in FIGS. 1-4), and a length extending from the first end portion to the second end portion. The chain linkage 14 also has a longitudinal forward facing side configured to oppose the elongate specimen S such that each chain link restraint 20 engages the specimen S at a respective line of contact on the longitudinal forward facing side of the chain linkage 20.

Referring to FIGS. 5-9, in the illustrated embodiment, each chain link restraint 20 comprises a substantially identical assembly. Each of the illustrated chain link restraints 20 comprises a chain link member 40, a specimen support 42 on a forward facing side of the chain link member, and an interchangeable stop member 44 on an inner side of the chain link member.

Figure 7:
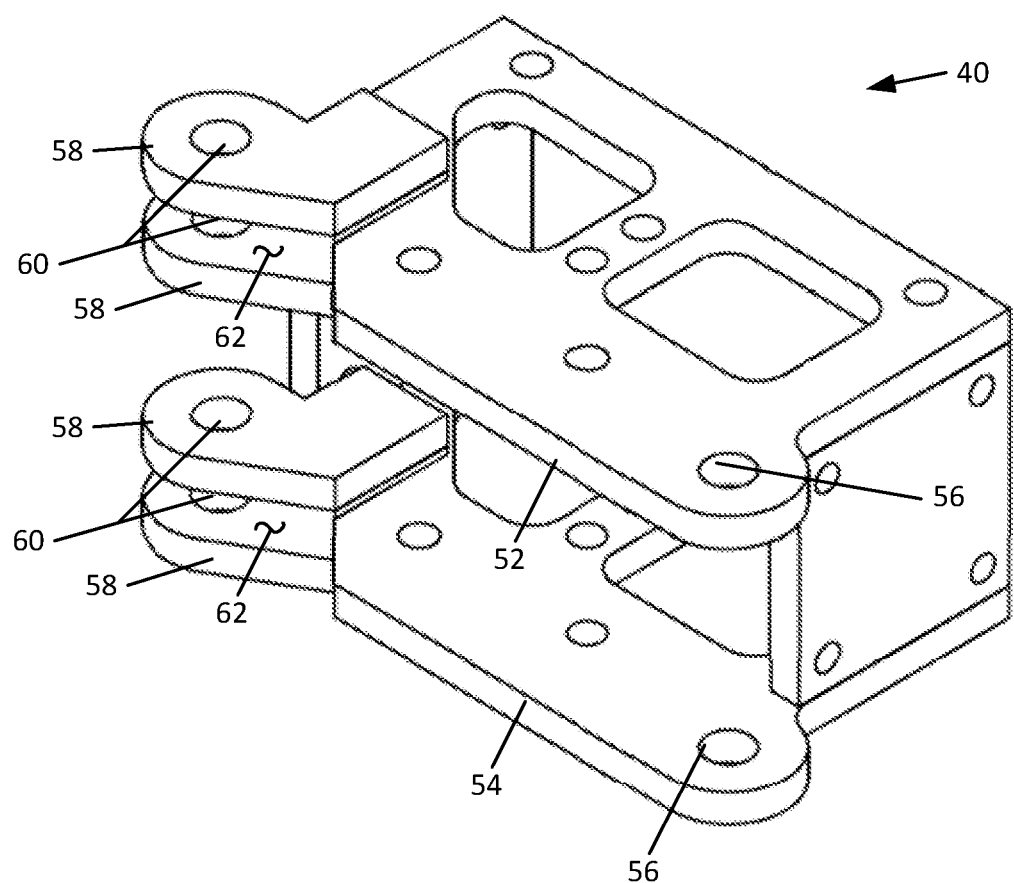
FIG. 7 is a perspective of a chain link member of the chain link restraint.

Each chain link member 40 comprises opposite first and second end portions spaced apart from one another in the lengthwise direction of the chain linkage 14. The chain link members 40 are configured so that the first end portion of one chain link member can be pivotably connected to the second end portion of an adjacent pin member by a chain pin 50 (FIGS. 2-4). Referring to FIG. 7, in the illustrated embodiment, the chain link member 40 comprises upper and lower plates 52, 54 that define upper and lower pin holes 56 centered a common pivot axis at the first end portion of the chain link member. The chain link member 40 further comprises a pair of offset plates 58 attached to the upper and lower surfaces of the second end portion of each of the upper and lower plates 52, 54. Each offset plate 58 extends proud of the edge of the respective one of the upper and lower plates 52, 54 and includes a pin hole 60. The pin holes 60 are aligned along another common pivot axis, and each pair of offset plates 58 is spaced apart heightwise to define a gap 62 between them. When the chain link members 40 are assembled together to form the chain linkage 14, the first end portion of each of the upper and lower plates 52, 54 is inserted into the respective gap 62 at the second end portion of an adjacent chain link member so that the pin holes 56 of the first chain link member align with the pin holes 60 of the latter chain link member. A chain link pin 50 (FIGS. 2-4) is installed in each set of aligned pin holes 56, 58 to pivotably couple the chain link members together as the chain linkage 14.

Referring briefly to FIGS. 2-4, in the illustrated embodiment, the first arm 32 is configured so that the arm-to-chain pin 35 is received in the pin holes 56 of the chain link member 40 that forms the first end portion of the chain linkage 14. Likewise, the second arm 34 is configured so that the arm-to-chain pin 35 is received in the pin holes 58 of the chain link member 40 that forms the second end portion of the chain linkage 14.

Figure 5:
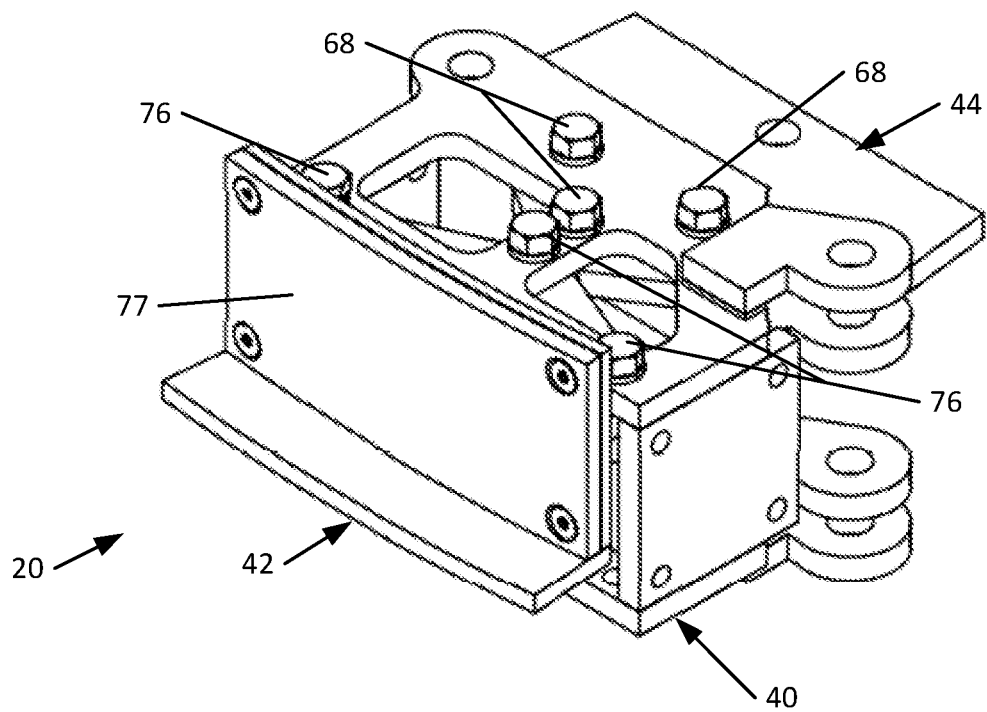
FIG. 5 is a perspective of a chain link restraint of the strain testing rig.
Figure 6:
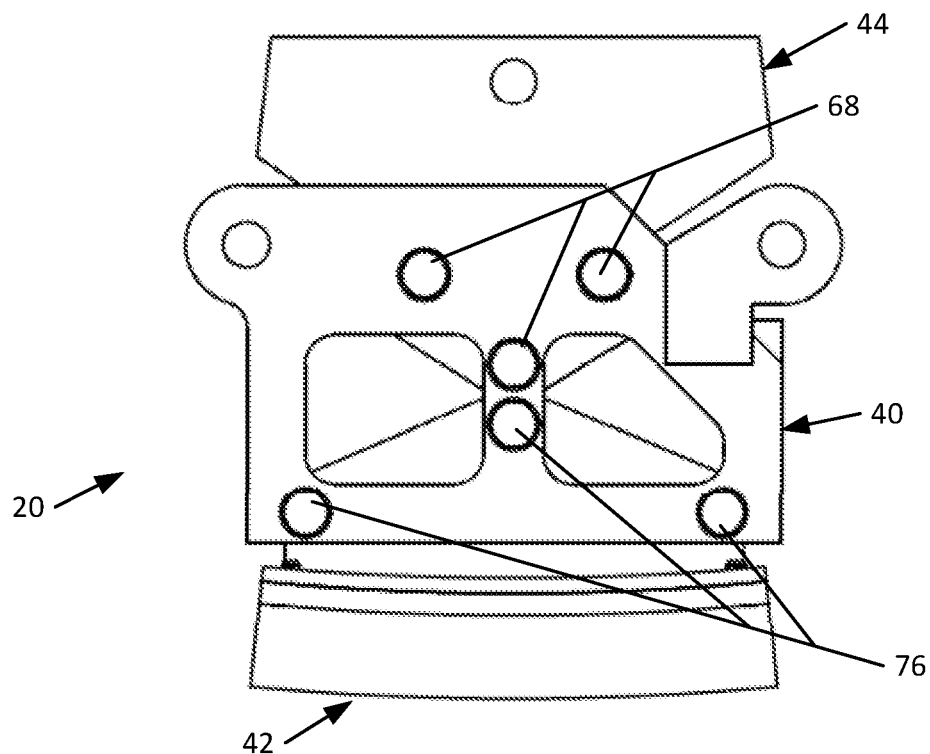
FIG. 6 is a top plan view of the chain link restraint.
Figure 8:
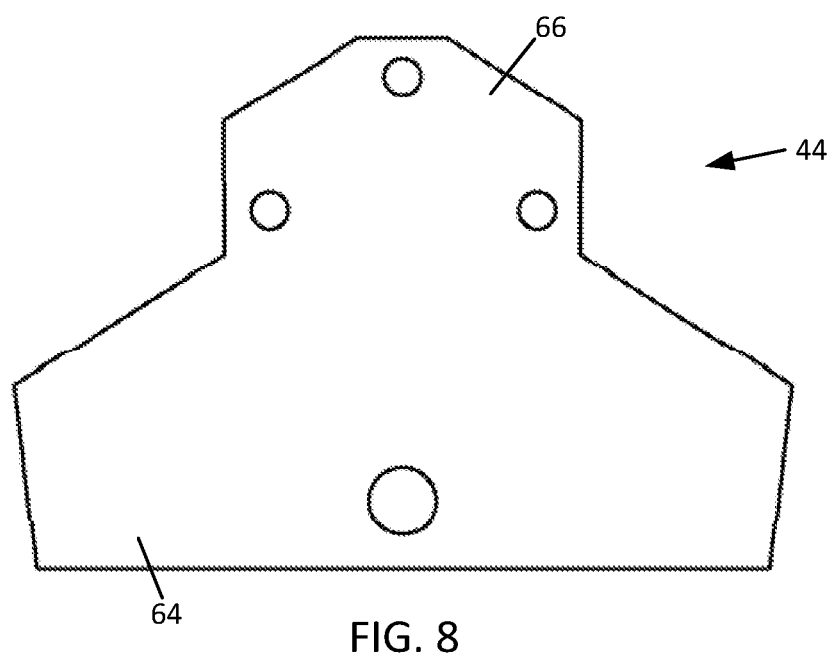
FIG. 8 is a top plan view of a stop member of the chain link restraint.

Referring to FIG. 8, in the illustrated embodiment, the stop member 44 comprises an elongate distal end portion 64 and a relatively short proximal end portion 66. The distal end portion 64 and the proximal end portion 66 each have a length in the lengthwise direction of the chain linkage 14, and the length of the distal end portion is greater than the length of the proximal end portion. In the illustrated embodiment, the proximal end portion 66 forms a tab-like projection from a middle region of the distal end portion. As shown in FIGS. 5 and 6, the proximal end portion 66 of the stop member is configured to be releasably fastened to the upper plate 52 of the chain link member 40 (e.g., using removable fasteners such as bolts 68). The distal end portion 64 of the stop member 44 projects from the hinged side of the chain link members. Opposite first and second edges of the distal end portion 64, which are spaced apart in the lengthwise direction of the chain linkage 14, are configured to form stops that engage the edges of the distal end portion of the adjacent stop members 44 to define an end position of the range of motion of the linkage (see FIGS. 1 and 4). The stop members 44 can be selectively replaced by other stop members of different sizes or shapes to make selected adjustments to the shape of the linkage 14 (e.g., to change the radius of curvature of the linkage) at the end position of its range of motion.

Figure 9:
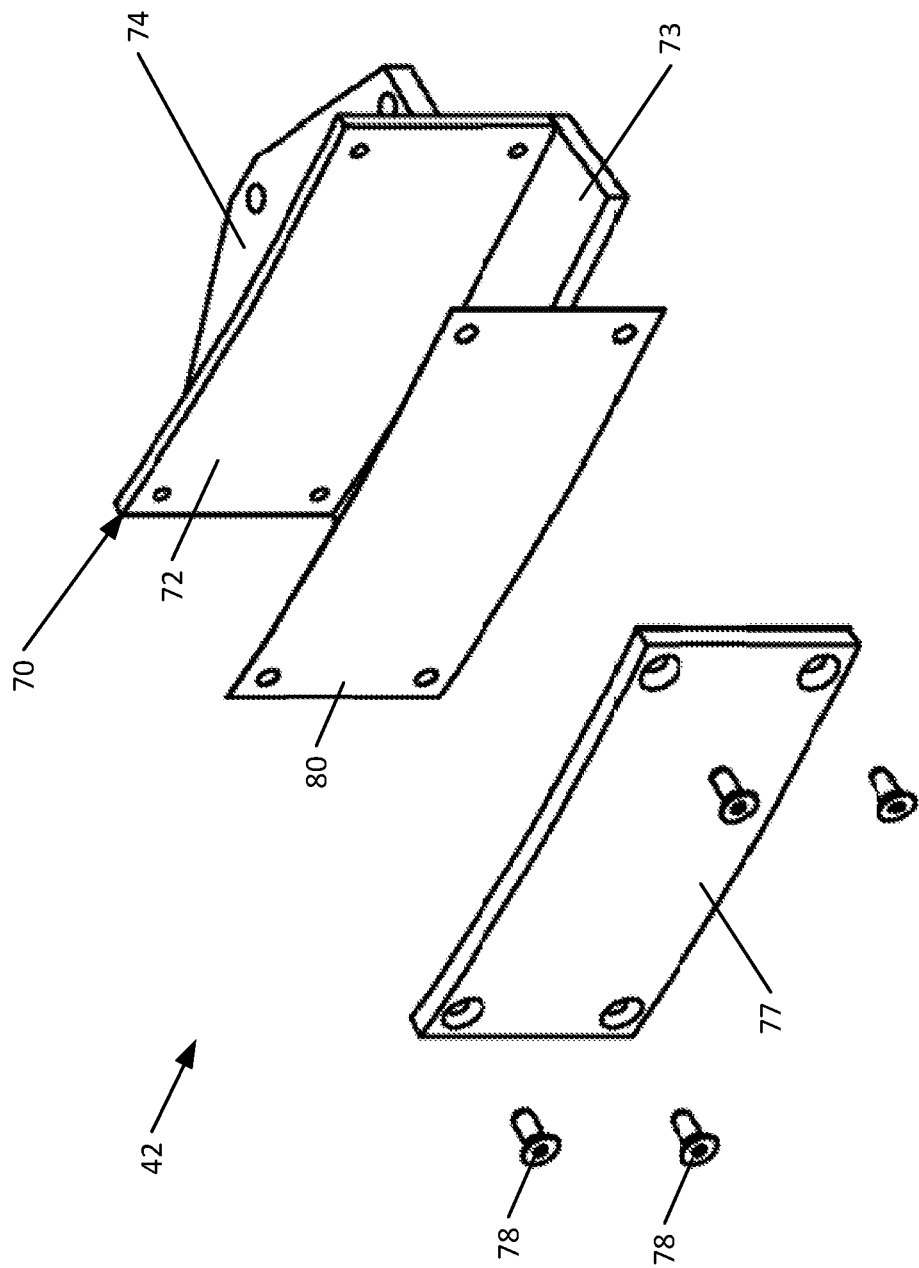
FIG. 9 is an exploded perspective of a specimen support of the chain link restraint.

Referring to FIG. 9, the illustrated specimen support 42 comprises a support bracket 70 that includes an upright press plate 72 and a lower support lip 73 that together form a generally L-shaped bracket. The support bracket 70 further comprises a mounting tab 74 that extends rearward from the press plate 72 on an opposite side as the support lip 72. The mounting tab 74 is configured to be releasably fastened to the upper plate 52 of the chain link member 40 (e.g., using removable fasteners such as bolts 76, as shown in FIGS. 5 and 6) to mount the specimen support 42 on the chain link member. The specimen support 42 further comprises a gripping pad 77 formed from resiliently compressible material. In the illustrated embodiment, the gripping pad 77 is secured to the upright press plate 72 via a set of attachment screws 78 and a strip of contact adhesive 80. When secured on the support bracket 70, the forward facing surface of the gripping pad 77 has a generally arcuate, convex shape. In this embodiment, the convex shape is achieved by forming the upright press plate 72 to be arcuate and conforming a flat strip of resiliently compressible material 76 to the arcuate press plate to form the gripping pad. As shown in FIGS. 1-4, the chain linkage 14 is configured to support the middle portion of the specimen S that extends between the clamps 36 such that the specimen rests on the lower support lips 73 and the middle portion of each gripping pad 77 defines the line of contact between the specimen and each respective chain link restraint 20.

Referring to FIGS. 3 and 4, having described the individual parts of the strain testing rig 10, the motion of the various parts of the rig, operating together, will now be briefly described. In general, the hydraulic cylinder 28 is configured to contract lengthwise from an extended position (FIG. 3) to a contracted position (FIG. 4). When the hydraulic cylinder 28 contracts, the centermost chain link restraint 20 remains fixed in in place with respect to the base and the remainder of the linkage 14 and the drive mechanism 16 move as constrained by the various connections in the linkage. In the extended position of the hydraulic cylinder 28, the arms 32, 34 are positioned to hold the chain linkage 14 in a straight configuration. For example, in the illustrated embodiment, the lines of contact between the chain linkage 14 and the specimen S are spaced apart along an imaginary line IL as shown in FIG. 3. When the hydraulic cylinder 28 contracts, the arms 32, 34 pivot about the arm-to-chain pins 35 such that the specimen clamps 36 rotate away from one another. Simultaneously, the arm-to-chain pins 35 move generally inward and rearward. This causes the forward facing longitudinal side of the chain linkage 14 that opposes the specimen S to adjust from straight to convexly curved. As may be understood by comparing FIGS. 3 and 4, the chain linkage 14 becomes progressively more curved as the cylinder 28 contracts. The lines of contact between the chain linkage 14 and the specimen S shift from being spaced apart along the imaginary line IL (FIG. 3) toward being spaced apart along an imaginary arc IA (FIG. 4). Eventually, the adjacent edges of the stop plates 44 engage one another to limit further movement of the linkage.

As can be seen, contraction of the hydraulic cylinder 28 causes the length along the specimen axis A of the specimen S between the specimen clamp 36 of the first arm 32 and the specimen clamp of the second arm 34 to increase. And in addition, contraction of the hydraulic cylinder causes the chain linkage 14 to adjust from the straight configuration (FIG. 3) to the curved configuration (FIG. 4). This imparts tension on the specimen S that stretches the specimen along the specimen axis A, while simultaneously bending the specimen. Contracting the hydraulic cylinder 28 also simultaneously forces each of the chain link restraints 20 outward against the specimen S as the forward facing side of the chain linkage 14 becomes progressively more convex. This causes a certain amount of bending of the specimen S, but the bending is a secondary effect. In that regard, the strain testing rig 10 is configured so that, when the drive mechanism moves the chain linkage 14 to simultaneously bend and stretch the specimen S, a greater portion of total deformation is attributable to stretching than bending.

The primary effect of making the chain linkage 14 progressively more convex, and thereby pressing each individual chain link restraint 20 against the specimen S, is to constrain each restrained portion RP of the specimen to move conjointly with the respective chain link restraint 20. In other words, the portion (e.g., set of particles) of the specimen S that make contact with the middle portion of each gripping pad 77 is substantially constant throughout the entire range of motion of the linkage 14. Thus, in the illustrated embodiment, the friction between each gripping pad 77 and the corresponding restrained portion RP of the specimen is sufficiently high to prevent slippage. And in instances when slippage is possible (e.g., the specimen has a very low coefficient of friction), each restrained portion RP of the specimen can be clamped to the upright press plate 72 of the chain link restraint 20 using a simple C-clamp to prevent slippage and constrain each restrained portion to move conjointly with the respective chain link restraint 20.

As can be seen by comparing FIGS. 3 and 4, by constraining each restrained portion RP of the specimen to move conjointly with the respective chain link restraint 20, the strain testing rig 10 individually tensions and bends each independent strain zone SZ. Thus, the drive mechanism 16 is configured to move each chain link restraint 20 to individually stretch each of the plurality of independent strain zones SZ of the specimen S along the specimen axis A as the chain linkage 14 moves from the first position to the second position. In the illustrated embodiment, the testing rig 10 is configured to impart substantially uniform forces on each of the independent strain zones SZ. For instance, the drive mechanism 16 is configured to move the chain link restraints 20 to increase the length of each independent strain zone by about the same amount and at about the same rate. The drive mechanism 16 is also configured to move each of the chain link restraints 20 to simultaneously bend and stretch each independent strain zone SZ. But, as mentioned above, the strain testing rig 10 is configured so that, when the drive mechanism 16 moves the chain linkage 14 to simultaneously bend and stretch each independent strain zone, a greater portion of a total deformation of each independent strain zone SZ is attributable to stretching (elongation along the specimen axis A) than bending.

In an exemplary method of using strain rig 10, an elongate specimen S of a material of interest is provided. Depending on what the desired strain characteristics of the material are, the interchangeable stop members 44 can be replaced with stop members of other sizes corresponding to different final curvatures of the linkage 14. The specimen S is positioned on the testing rig 10 with each opposite end portion secured by a respective clamp 36. In the supported position, the middle portion of the specimen S rests on the underlying support lips 73 of the chain linkage 14 and the forward facing surfaces of the gripping pads 76 are engaged with the opposing longitudinal surface of the specimen S at corresponding restrained portions RP of the specimen. If desired, strain gauges can be attached to the specimen S at one or more locations along each of the independent strain zones SZ. In certain embodiments, a suitable camera-based system for detecting one or more characteristics of the deformation of each of the independent strain zones SZ is set up to monitor the deformation of the specimen S. In one or more embodiments, sensors are also used to monitor the performance of the hydraulic cylinder 28. For example, a linear transducer can be used to detect the stroke of the cylinder and/or a force or pressure sensor can be used to detect the amount of force that the cylinder is using to contract. It is contemplated that any instrumentation or camera-based monitoring system for detecting one or more physical properties of the specimen S as it is deformed by the testing rig 10 and/or which provides information about the forces being imparted on the specimen can be used during testing without departing from the scope of the disclosure.

Subsequently, the hydraulic cylinder 28 is contracted. As explained above, the individual chain link restraints 20 press outward against the corresponding restrained portions RP and thereby constrain the restrained portions to move conjointly with them. Meanwhile, as the forward facing longitudinal side of the chain linkage 14 becomes progressively more convex, the chain link restraints 20 cause the independent strain zones SZ located between them to simultaneously bend and stretch along the specimen axis A. The hydraulic cylinder 28 continues to contract until the edges of the stop members 44 engage one another to stop further movement of the linkage. During and/or upon completion of the hydraulic actuation, the strain effects on each independent strain zone SZ can be evaluated separately (e.g., based on the outputs of the strain gauges, camera-based monitoring systems, sensors associated with the hydraulic cylinder 28, etc.). Based on these assessments, it is believed to be possible to make a more reliable predictive assessment of the suitability of the specimen material for use as pipe insulation for pipes used in certain offshore reeling operations.

In another method of using the strain rig 10, the one-piece specimen S described above can be replaced by a composite specimen to simulate the laminated layers of an insulated pipe used in the field. For instance, a specimen may be provided with a thin strip of metal or metal conduit, coated with a fusion bonded epoxy and a further layer of an insulation material of interest. Testing this type of composite specimen in the strain rig 10 can provide an indication of how well the lamination of the different materials will withstand the reeling process. Depending on the thickness of the metal layer used in the composite specimen, the drive mechanism 16 or linkage 14 might need to be resized to facilitate bending the now-stiffer specimen.

In some cases, it might be desirable to simulate the twisting of pipe about the longitudinal axis that can occur during reeling operations, which creates an additional torsional load on the insulation material. The inventor contemplates that the strain testing rig 10 can be used to simulate twisting, along with stretching and bending, by providing a set of change parts for interchangeably replacing the linkage 14 and the arms 32, 34. The linkage formed by the change parts would be similar to the linkage 14, except that the chain link restraints and arms would be configured so that the axes of the chain pins and arm-to-chain pins are non-parallel and cause the chain link restraints outboard of the fixed center restraint to rotate in twist as the cylinder drives the linkage through its range of motion.

Accordingly, the inventors believe that the illustrated strain rig 10 enables commercially viable laboratory testing of material specimens for purposes of evaluating the suitability of specimen materials for reeling operations. Instead of concentrating the strain on small ISO or ASTM sized-specimen and thereby isolating the strain within a controlled region, the strain rig 10 takes a much longer specimen and constrains it to force the strain to occur somewhat evenly within independent strain zones SZ spaced apart along the length. This simulates to effect of the steel pipe that will underlie the insulation in the field, and moreover, provides more robust predictive information about how a greater length of material will behave when stretched (and, to a lesser extent, bent) in a reeling operation. Moreover, the proposed rig 10 is laboratory-scaled in that it can fit inside and used within a conventional laboratory space for such equipment (e.g., a room section with a footprint of less than 400 square feet and a height of less than ten feet).

Although the above-described strain testing rig 10 is designed specifically for laboratory-scale testing of specimens S, it is contemplated that a much larger version of the testing rig 10 could be made for performing similar tests of full-scale insulated pipe specimens or other types of very large specimens. Such a full scale testing rig would generally comprise at least three movable restraints for engaging the full-scale specimen at respective points of contact spaced apart along the longitudinal axis of the specimen and a drive mechanism configured to move the restraints to stretch independent strain zones of the specimen between the points of contact so that the length of each independent strain zone increases. For instance, a strain rig could be assembled comprising a chain linkage with much larger chain link restraints than the linkage 14 shown above and/or a chain linkage comprising a greater number of chain link restraints pivotably connected end-to-end to extend along the greater length of a full-scale specimen. As compared with the prior art full-scale testing rig described above in the background section, the novel full-scale testing rig disclosed here would advantageously constrain the full-scale specimen so that discrete independent strain zones of the specimen are deformed simultaneously and independently of the strain in the other strain zones. As explained above, this is thought to provide more robust information about the characteristics of the specimen and its usefulness for reeling operations.

Another exemplary method of testing strain characteristics of a specimen S will now be briefly described. In accordance with the present method, digital image correlation is used to separately (and simultaneously) measure strain on each of at least three independent strain zones SZ. Prior to stretching the specimen S, a user applies a pattern to a surface of each of the independent strain zones SZ. In an exemplary embodiment the pattern comprises a pattern of tracking dots. After applying the pattern, the specimen S is stretched in the manner described above, e.g., such that strain on each of the independent strain zones SZ during stretching is independent of strain on the remainder of the specimen. Images are captured of the patternized surface of the specimen S before, during, and after stretching. Then, strain (e.g., surface strain) is calculated for each of the strain zones SZ separately based on the images. The inventors believe that the use of such digital image correlation in combination with independent strain zones SZ created by the strain testing rig 10 provides for robust evaluation of the strain characteristics of a material using only a single specimen in a single strain-inducing test.

Figure 10:
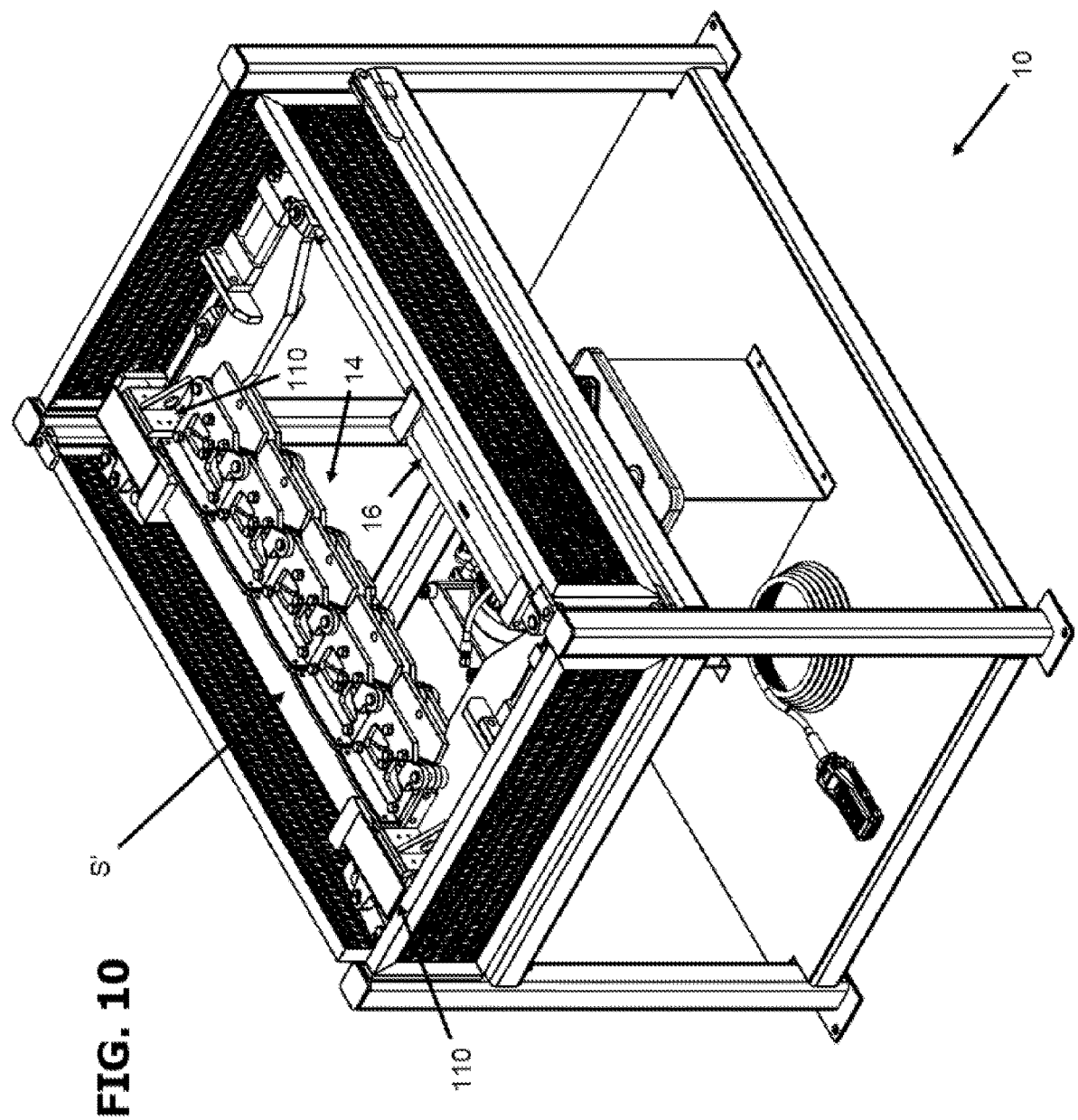
FIG. 10 is a perspective of the strain testing rig in a different configuration in which end clamps for securing the specimen to the strain testing rig are replaced by grips.
Figure 11:
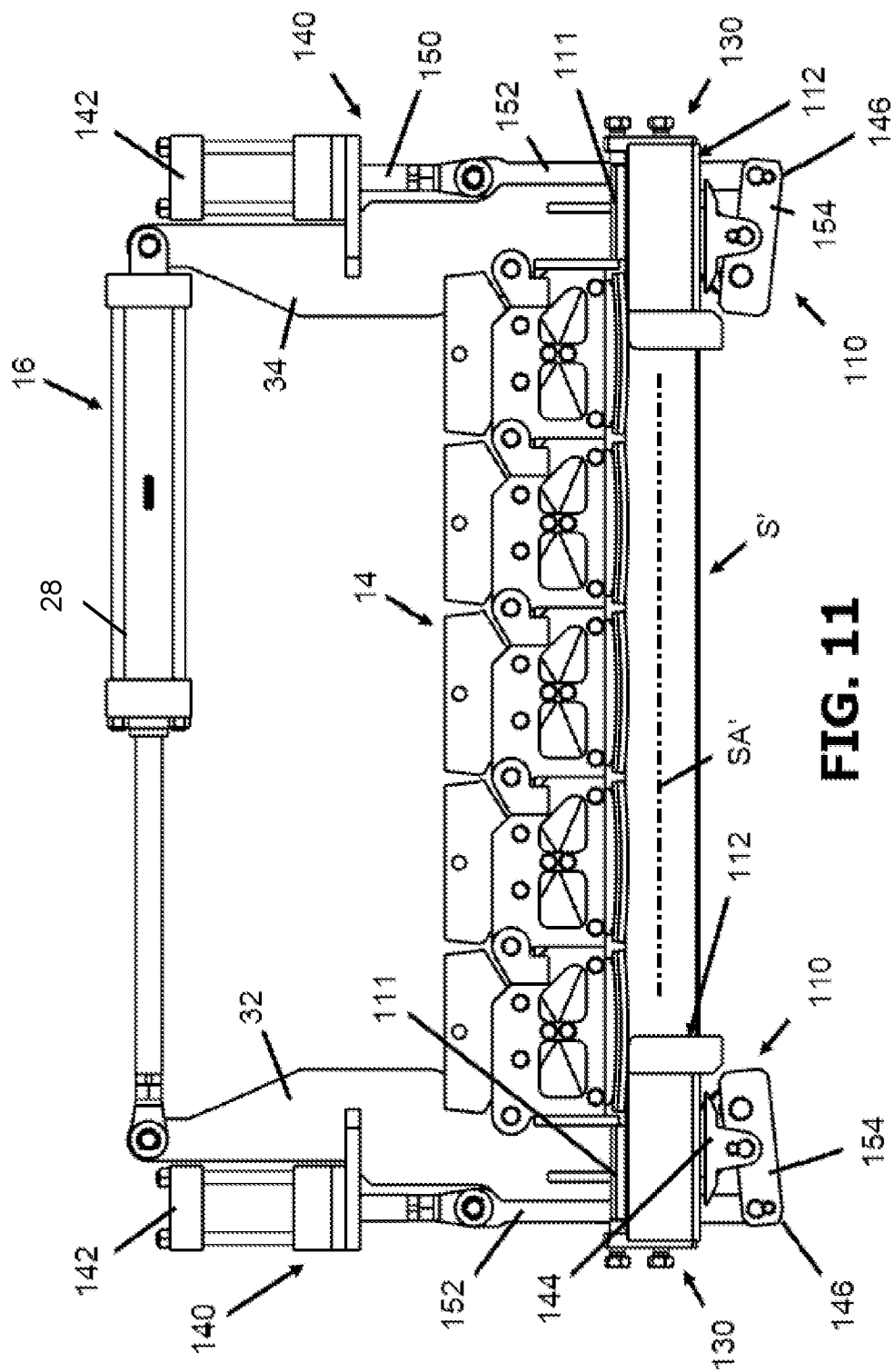
FIG. 11 is a top plan view of a sub-assembly of the strain testing rig as configured in FIG. 10.
Figure 12:
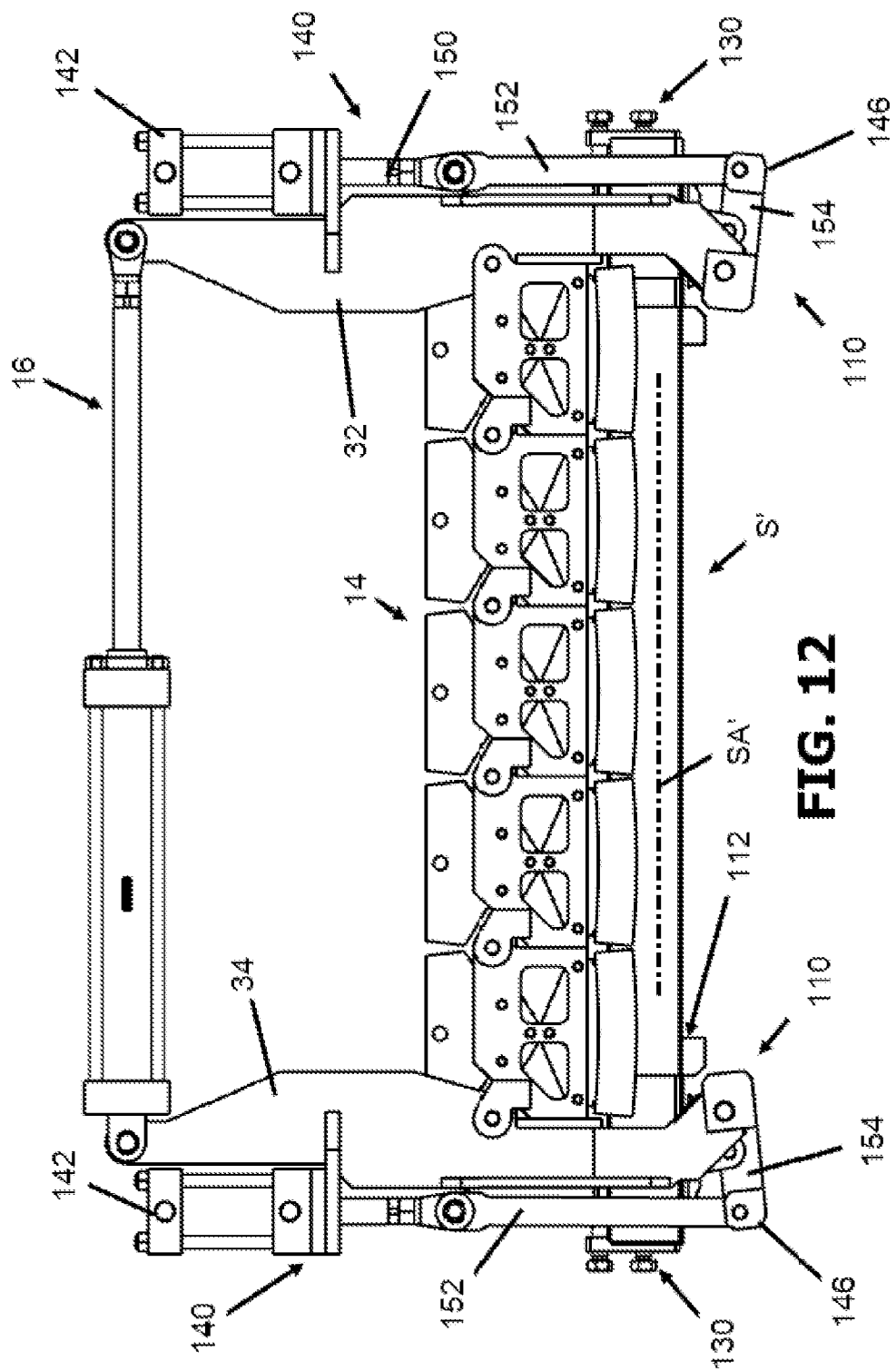
FIG. 12 is a bottom plan view of the sub-assembly of FIG. 11.

Referring now to FIGS. 10-12, in an exemplary embodiment, the strain testing rig 10 is modified to replace the specimen end clamps 36 with first and second grips, each generally indicated at reference number 110. The strain rig 10 depicted in FIGS. 10-12 is unchanged from what is described above except that the end clamps 36 are replaced by the grips 110. In FIGS. 10-12, the same reference numbers are used for the unchanged components of the strain rig 10.

The inventors believe that it is desirable to test specimens S that have a thickness that is about the same as the thickness of full-scale insulation applied on a pipe. But at larger thicknesses, the elongation of the specimen during testing causes notable decreases in specimen cross-sectional area. As the cross-sectional area of the specimen decreases, the simple specimen end clamps 36 can loosen such that the end portions of the specimen S slide within or decouple from the clamps. To solve this problem, the inventors first considered securing the end portions of the specimen to the strain testing rig 10 by placing pins in holes formed in the end portions of the specimen. But upon evaluation, the inventors found that, for high tensile strength materials, the specimen could tear or the pin could shear during stretching. As explained more fully below, the grips 110 are configured for gripping the end portions of a specimen S in a way that inhibits loosening of the end portions of the specimen in the grips as the cross-sectional area of the specimen decreases during stretching. Furthermore, unlike attaching the specimen by placing pins into holes formed in the specimen's end portions, the grips 110 securely hold the specimen without failing or doing damage to the specimen, even when the specimen has a full-scale thickness and is made of a very high tensile strength material.

Figure 13:
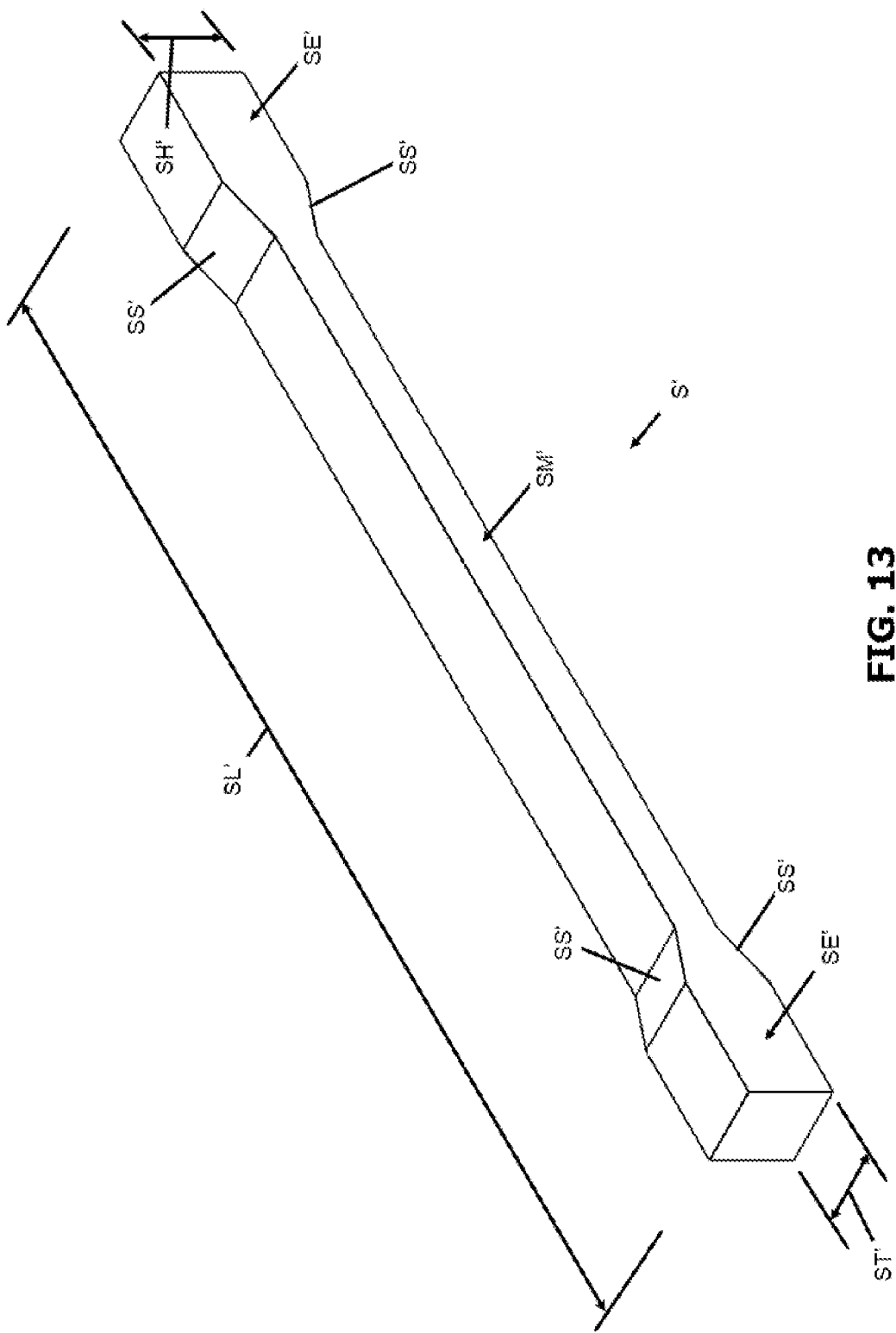
FIG. 13 is a perspective of a specimen for use with the strain testing rig as configured in FIG. 10.

Referring to FIG. 13, the illustrated grips 110 are configured to grip a specimen S' that is modified in relation to the specimen S used with the clamps 36 described above. In comparison to the above-described specimen S, the modified specimen S' has end portions SE' that are more enlarged relative to the middle portion SM' of the specimen. The specimen S' has a specimen length SL' along the specimen axis SA', a specimen thickness ST' (broadly, a first specimen cross-sectional dimension), and a specimen height SH' (broadly, a second specimen cross-sectional dimension perpendicular to the first specimen cross-sectional dimension). The specimen thickness ST' is uniform along the specimen length SL'. By contrast, the specimen height SH' varies along the specimen length SL'. In particular, the end portions SE' define a maximum specimen height SH' and the middle portion SM' defines a minimum specimen height. The end portions SE' comprise tapered shoulders SS' that face inboard lengthwise. The specimen height SH' gradually decreases from the maximum specimen height to the minimum specimen height as the tapered shoulders SS' extend lengthwise from respective outboard ends to respective inboard ends. The middle portion SM' of the specimen S' has as a uniform cross sectional shape along its entire length, e.g., the middle portion has the minimum specimen height along its entire length. In an exemplary embodiment, the minimum specimen height SH' is at least 10% less than the maximum specimen height (e.g., at least 20% less, at least 30% less). As explained more fully below, the grips 110 are configured to engage the tapered shoulders SS' of the specimen S' so that the tapered shoulders become progressively wedged more tightly against the grips as the strain testing rig 10 stretches the specimen.

Referring to FIGS. 10-12 and 14-15, the strain rig 10 comprises a first grip 110 for gripping the first end portion SE' of the specimen S', a second grip 110 for gripping the second end portion of the specimen, and a drive mechanism 16 (discussed above) configured to move the first grip away from the second grip to stretch the specimen lengthwise. As explained above, the illustrated strain rig 10 comprises first and second arms 32, 34 (each, broadly, a support) and the drive mechanism 16 comprises a hydraulic cylinder 28 for driving the arms in rotation. Each arm 32, 34 is pivotably connected to one end of a chain linkage 14. In the illustrated embodiment, each grip 110 is mounted on a respective arm 32, 34 similar to how the clamps 36 are mounted to the arms above. Hence, when the drive mechanism 16 is actuated to rotate the arms 32, 34, the grips 110 move with the arms 32, 34 in the same manner as the clamps 36 described above.

The chain linkage 14 thus stretches to the specimen S' so that strain imparted on each of a plurality of independent strain zones along the middle portion SM" of the specimen is independent of strain on the remainder of the specimen. Although the illustrated grips 110 are used in a strain rig 10 that is configured to define a plurality of independent strain zones along the specimen S', it will be understood that the grips can also be used with other types of strain testing devices, such as simple load beds that stretch a specimen S' lengthwise as a single unit.

Each grip 110 is mounted on the respective arm 32, 34 of the strain testing rig 10 for movement with the arm when the drive mechanism 16 is actuated. In the illustrated embodiment each grip comprises a brace plate 111 (FIG. 11) and a dog 112. As explained more fully below, the brace plate 111 is fixedly mounted on the respective arm 32, 34 and the dog 112 is moveable such that the end portion SE' of the specimen can be compressed between the brace plate and the dog 112.

Figure 14:
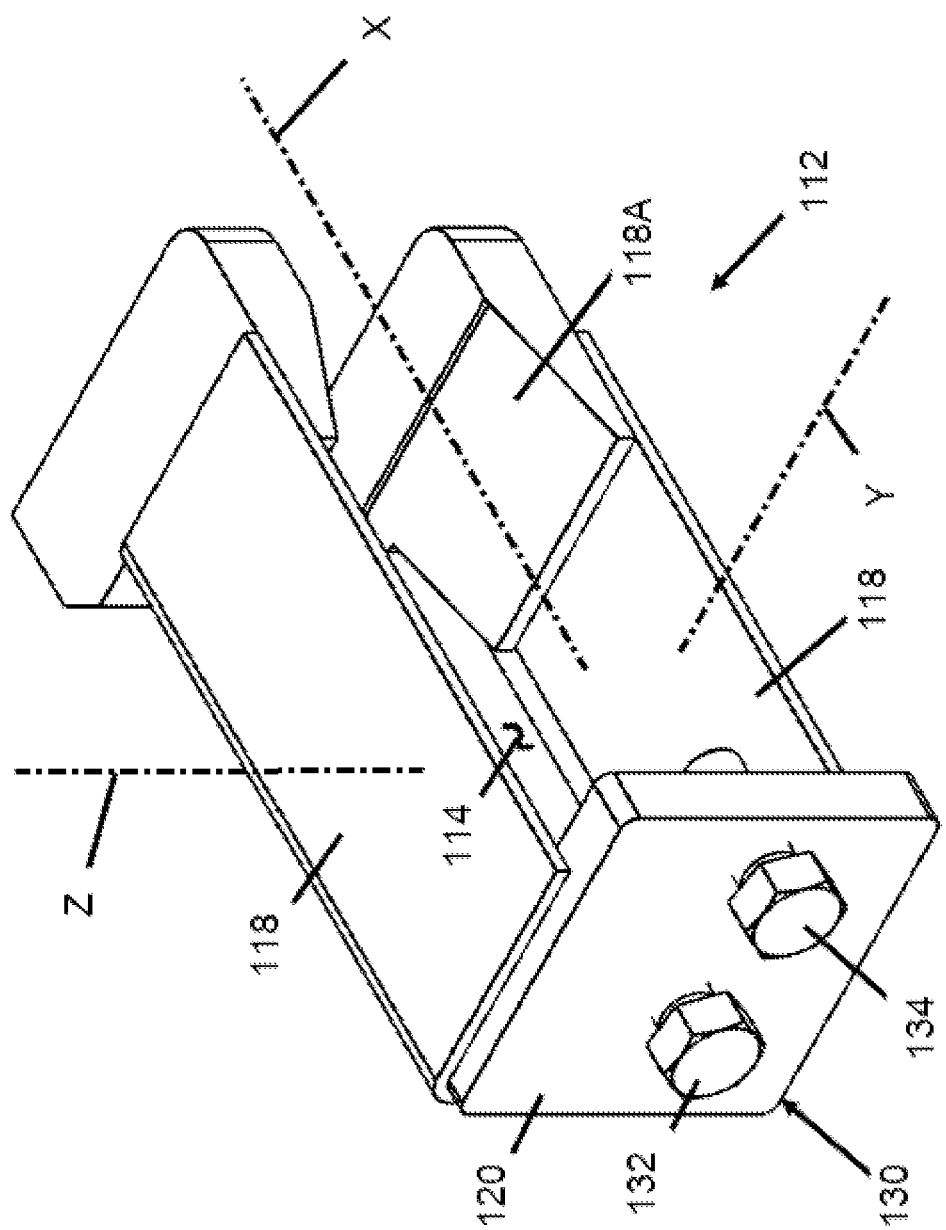
FIG. 14 is a perspective of a dog of one of the grips.
Figure 15:
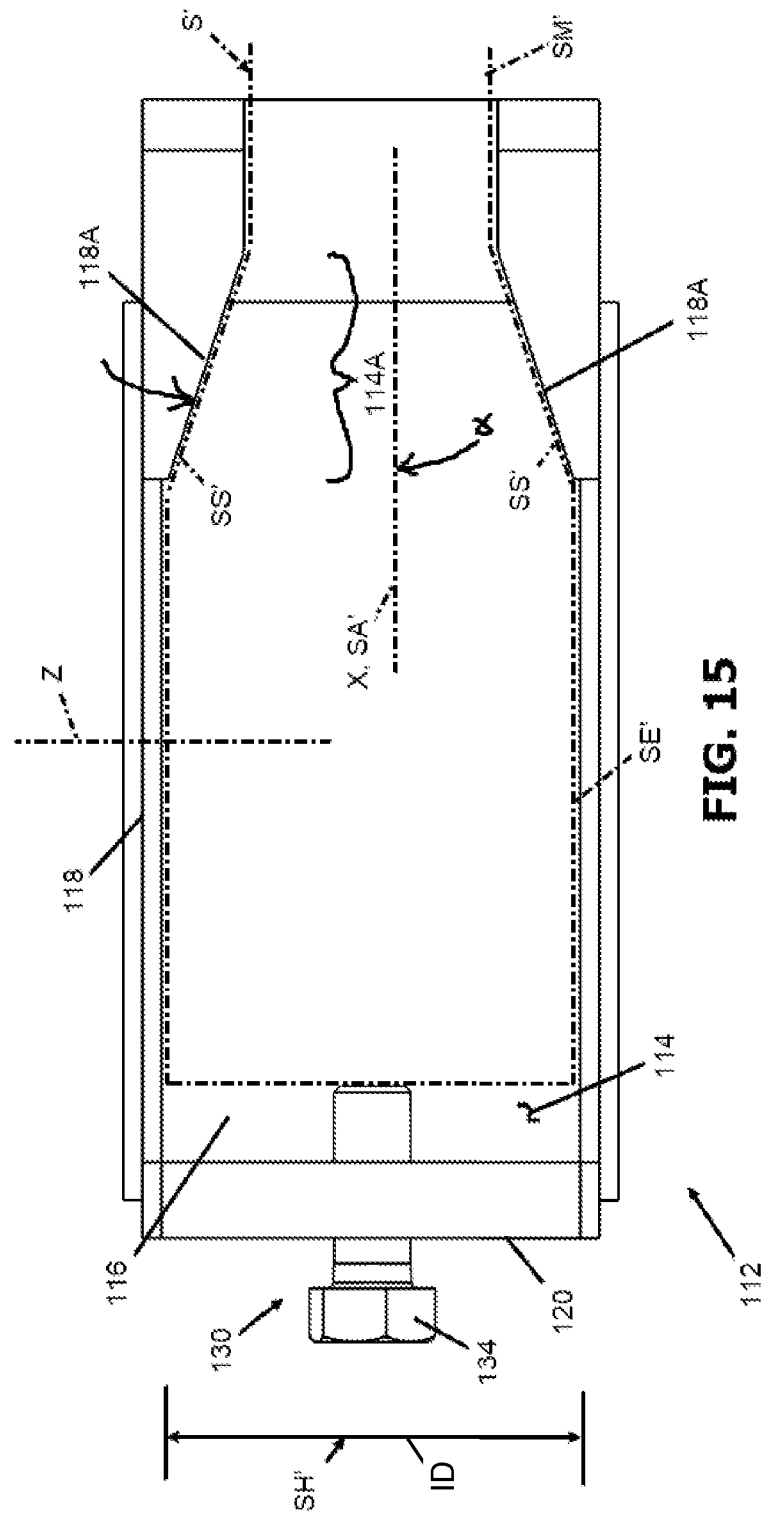
FIG. 15 is an elevation of the dog in which an end portion of the specimen of FIG. 13 is shown in phantom.

Each dog 112 is generally configured to encapsulate and interlock with the enlarged end portions SE' of the specimen. In the illustrated embodiment, each dog 112 comprises a tapered dog with tapered interior sides against which the tapered shoulders SS' of the specimen are wedged during stretching. The tapered dog 112 is generally shaped and arranged to engage the tapered shoulders SS' of the specimen S' such that the tapered dog 112 is configured to press outboard against the tapered shoulders as the drive mechanism moves the first grip away from the second grip to stretch the specimen lengthwise. As explained more fully below, the tapered dog 112 is shaped and arranged to inhibit the end portion SE' of the specimen S' from loosening in the grip 110 as the cross-sectional area of the specimen decreases due to strain during stretching. The first and second tapered dogs 112 are mirror images of one another. FIGS. 14 and 15 illustrates one of the tapered dogs 112, but it will be understood that the other tapered dog has the same features in mirror image. As shown in FIG. 14, each tapered dog 112 has X, Y, and Z axes, wherein the dog is configured so that the X axis is parallel to the specimen axis SA' at the respective end portion SE' of the specimen S', the Y axis is perpendicular to the X axis, and the Z axis is perpendicular to the Y axis and the X axis. A detailed description of one of the dogs 112 will now be provided in relation to FIGS. 14 and 15, but it is to be understood that the same description applies to the other dog not shown in these drawings.

The dog 112 has an inboard end portion and an outboard end portion spaced apart along the longitudinal X axis. The dog 112 comprises a base 116 extending generally parallel to the X-Z plane and first and second side walls 118 extending from the base along the Y axis. The first and second side walls 118 are spaced apart along the Z axis and separated by a cavity 114 in which the dog 112 is configured to receive the respective end portion SE' of the specimen S. The cavity 114 has an open inboard end opening through the inboard end portion of the dog 112, and the dog comprises an outboard end wall 120 at the outboard end of the cavity. The side of the dog 112 opposite the base 116 is open so that the end portion SE' can be placed into the cavity 114. As shown in FIG. 15, once the end portion SE' is placed into the cavity 114, the middle portion SM' extends from the cavity through the open inboard end portion of the dog 112. The illustrated dog 112 is configured to receive the respective specimen end portion SE' in the cavity 114 such that the specimen height SH' is parallel to the Z axis.

The cavity 114 has an inner dimension ID parallel the Z axis and includes a tapered section 114A (FIG. 15) along which the inner dimension decreases as the cavity extends inboard along the X axis. The tapered section 114A has an inboard end and an outboard end spaced apart along the X axis. The tapered section 114A has a maximum inner dimension ID at the outboard end and a minimum inner dimension at the inboard end. In one or more embodiments, the minimum inner dimension is less than 90% of the maximum inner dimension (e.g., less than 80% or less than 70%).

In the illustrated embodiment, each of the first and second side walls 118 of each dog 112 includes an angled section 118A, and the angled sections of the side walls define the tapered section 114A of the cavity 114. The angled sections 118A of the side walls 118 are configured to press outboard against the tapered shoulders SS' of the specimen as the drive mechanism 16 moves the first grip 110 relative to the second grip 110 to stretch the specimen A' lengthwise. Each angled section is configured to define an included angle α with respect to the X axis in an inclusive range of from about 5° to about 45°. It can be seen that the opposing angled sections 118A are formed so that the tapered section 114A of the cavity 114 is generally wedge-shaped. When the strain testing rig 10 stretches the specimen S', the angled sections 118A move outboard along the X axis, wedging the tapered shoulders SS' of the specimen into the tapered section 114A of the cavity 114. As the cross-sectional area of the specimen S' decreases during stretching, the end portions SE' of the specimen might shift slightly inboard along the X axis in relation to the dog 112, but when this occurs, the shoulders SS' become progressively wedged into the tapered section 114A of the cavity 114. Hence, the angled sections 118A of the dog 112 continuously press outboard on the tapered shoulders SS' of the specimen even as the cross-sectional area of the specimen decreases.

Each grip 110 further comprises a clamp 130 for clamping the tapered shoulders SS' of the specimen S' along the X axis against the angled sections 118A of the first and second side walls 118. In the illustrated embodiment, the clamp 130 comprises a first set screw 132 that is threadably connected to the outboard end wall 120 of the dog 112. In particular, the illustrated dog 112 comprises a threaded opening in the outboard end wall 120 and the set screw 132 is threadably received in the opening such that rotation of the set screw in the threaded opening advances or retracts the set screw along the X axis. In use, before the drive mechanism 16 of the strain testing rig 10 is actuated to stretch the specimen S', the end portion SE' of the specimen is placed into the cavity 114 and the set screw 132 is advanced to clamp the tapered shoulders SS' tightly against the angled sections 118A of the side walls 118. Each grip 110 also comprises a second set screw 134 that is used to eliminate slack between the strain testing rig 10 and the specimen, as described in further detail below.

Referring to FIGS. 11 and 12, the grip 110 further comprises a press 140 for compressing the end portion SE' of the specimen S' along the Y axis and thereby gripping the end portion of the specimen tightly in the grip 110. In the illustrated embodiment, each press 140 comprises a hydraulic cylinder 142 (broadly, a linear actuator), a press plate 144 (broadly, a presser), and a linkage 146 operatively connecting the hydraulic cylinder to the press plate such that the cylinder drives the press plate to compress the respective end portion SE' of the specimen S' along the Y axis when the hydraulic cylinder is actuated. The press plate 144 is positioned against the back side of the base 116 of the tapered dog 112. During use, the base of the tapered dog 112 and the brace plate 111 are located on opposite sides of the specimen S'. The press 140 is configured to press the tapered dog 112 along the Y axis toward the brace plate 111, thereby compressing the end portion SE' of the specimen between the base 116 and the brace plate.

In the illustrated embodiment, the hydraulic cylinder 142 comprises a piston 150 oriented generally parallel to the Y axis so that, when the hydraulic cylinder 142 is actuated, the piston retracts away from the dog 114 generally along the Y axis. The linkage 146 comprises a link 152 and a rocker 154 connected between the piston 150 and the press plate 144. Each of the link 152 and the rocker 154 has a first end portion, an opposite second end portion, and a length extending from the first end portion to the second end portion. The first end portion of the link 152 is pivotably connected to the piston 150. The first end portion of the rocker 154 is pivotably connected to the second end portion of the link 152. The second end portion of the rocker is pivotably connected to the respective arm 32, 34 of the strain testing rig 10. The press plate 144 is pivotably connected to the rocker 154 at a middle location spaced apart between the first and second ends of the rocker. To actuate the press 140, the cylinder 142 retracts the piston 150, which adjusts the linkage 145 such that the rocker 154 pivots about a pin connecting the rocker the respective arm 32, 34. This moves the press plate 144 toward the brace plate 111 along the Y axis.

To use the grips 110 in a strain testing procedure, the user first installs the end portions SE' of the specimen in the dogs 112. The dogs 112 can be removed from the strain testing rig 10 during this step. The user places the end portions SE' of the specimen into the cavities 114 of the tapered dogs 112 and extends the set screws 132 to clamp the tapered shoulders SS' along the X axis against the angled sections 118A of the dog side walls 118. The user then positions the dogs 112 on the strain testing rig 10 between the corresponding press plate 144 and brace plate 111.

Next, to eliminate slack between the strain testing rig 10 and the specimen, the user advances the second set screws 134. These set screws 134 advance along the X axis and engage an outboard edge of the fixed brace plate 111. This imparts a small amount of lengthwise tension on the specimen S' to ensure there is no slack between the specimen and the strain testing rig 10 prior to actuating the drive mechanism 16.

Subsequently, each press 140 is actuated to compress the respective end portion SE' along the Y axis between the tapered dog 112 and the brace plate 111. During testing, the drive mechanism 16 is actuated to stretch the specimen S' as described above. As the cross-sectional area of the specimen S' decreases due to elongation of the specimen, the tapered shoulders SS' of each end portion SE' of the specimen are continuously drawn into engagement with the angled sections 118A of the dog side walls 118 so that the end portions SE' of the specimen do not loosen and dislodge from the grips 110. As the specimen S' stretches and decreases in cross-sectional area, the encapsulating, wedge-shaped geometry of the dogs 112 resists loosening of the end portions SE' in the grips 110 along the Z axis, and the presses 140 simultaneously holds the end portions SE' in compression along the Y axis. The grips 110 thus firmly grip the end portions SE' of the specimen S' and continuously stretch the specimen lengthwise, even as the cross-sectional area of the specimen decreases.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A strain testing rig for testing an elongate specimen having a first end portion and a second end portion spaced apart along a specimen axis and a length extending from the first end portion to the second end portion along the specimen axis, the strain testing rig comprising:
    a first grip for gripping the first end portion of the specimen;
    a second grip for gripping the second end portion of the specimen;
    a support surface positioned to engage a central portion of the specimen; and
    a drive mechanism configured to move the first grip away from the second grip to stretch the specimen lengthwise, and to bend the specimen against the support surface;
    wherein the first grip and the second grip are configured to maintain a grip on the specimen as cross-sectional area of the specimen decreases during stretching.

2. The strain testing rig as set forth in claim 1, wherein each of the first grip and the second grip comprises a tapered dog shaped and arranged to engage tapered shoulders of the specimen facing inboard along the specimen axis such that the tapered dog is configured to press outboard against the tapered shoulders as the drive mechanism moves the first grip away from the second grip to stretch the specimen lengthwise, whereby the tapered dog inhibits first and second end portions of the specimen from loosening in the first and second grips as cross-sectional area of the specimen decreases due to strain as the specimen stretches.

3. The strain testing rig as set forth in claim 2, wherein each dog has an inboard end portion and an outboard end portion spaced apart along a longitudinal X axis, each dog being configured so that the X axis is parallel to the specimen axis at the respective end portion of the specimen, each dog also having a Y axis perpendicular to the X axis, and a Z axis perpendicular to the Y axis and the X axis, the dog defining a cavity configured to receive the respective end portion of the specimen therein, each cavity having an inner dimension parallel the Z axis of the dog and including a tapered section along which the inner dimension decreases as the cavity extends inboard along the X axis.

4. The strain testing rig as set forth in claim 3, wherein each dog comprises a base extending generally in an X-Z plane and first and second side walls extending along the Y axis from the base, the first and second side walls being spaced apart along the Z axis.

5. The strain testing rig as set forth in claim 4, wherein each of the first and second side walls of each dog includes an angled section, the angled sections defining the tapered section of the cavity.

6. The strain testing rig as set forth in claim 5, wherein the angled sections of the first and second side walls of each dog are configured to press against the tapered shoulders of the specimen as the drive mechanism moves the first grip relative to the second grip to stretch the specimen lengthwise.

7. The strain testing rig as set forth in claim 5, wherein each angled section is configured to define an included angle with respect to the respective X axis of from about 5° to about 45°.

8. The strain testing rig as set forth in claim 5, wherein each grip further comprises a clamp for clamping the first end portion of the specimen along the X axis against the angled sections of the first and second side walls.

9. The strain testing rig as set forth in claim 4, wherein each grip further comprises a press for compressing the respective end portion of the specimen along the Y axis.

10. The strain testing rig as set forth in claim 9, wherein each press comprises a linear actuator, a press plate, and a linkage operatively connecting the linear actuator to the press plate such that the linear actuator drives the press plate to compress the respective end portion of the specimen along the Y axis when the linear actuator is actuated.

11. The strain testing rig of claim 10, further comprising a first support and a second support, the first grip being mounted on the first support and the second grip being mounted on the second support.

12. The strain testing rig of claim 11, wherein each linkage comprises:
 a link having a first end portion and an opposite second end portion, the first end portion of the link being pivotably connected to the linear actuator, and
 a rocker having a first end portion and an opposite second end portion, the first end portion of the rocker being pivotably connected to the second end portion of the link, the second end portion of the rocker being pivotably connected to the respective one of the first and second supports, the rocker being pivotably connected to the press plate at a location spaced apart between the first and second end portions of the rocker.

13. The strain testing rig as set forth in claim 11, wherein each of the first support and the second support comprises a brace plate, wherein each brace plate and the base of the respective dog are configured to engage opposite sides of the specimen.

14. The strain testing rig as set forth in claim 13, wherein actuation of each linear actuator presses the corresponding press plate against the base of the respective dog to urge the dog toward the corresponding brace plate.

15. A strain testing rig for testing an elongate specimen having a first end portion and a second end portion spaced apart along a specimen axis and a length extending from the first end portion to the second end portion along the specimen axis, the strain testing rig comprising:
 a first grip for gripping the first end portion of the specimen;
 a second grip for gripping the second end portion of the specimen;
 wherein each of the first grip and the second grip comprises a tapered dog having angled sections shaped and arranged to engage tapered shoulders of the specimen facing inboard along the specimen axis such that the tapered dog is configured to press outboard against the tapered shoulders as the drive mechanism moves the first grip away from the second grip to stretch the specimen lengthwise, each dog having an inboard end portion and an outboard end portion spaced apart along a longitudinal X axis, each dog being configured so that the X axis is parallel to the specimen axis at the respective end portion of the specimen, each dog also having a Y axis perpendicular to the X axis, and a Z axis perpendicular to the Y axis and the X axis, the dog defining a cavity configured to receive the respective end portion of the specimen therein, each cavity having an inner dimension parallel the Z axis of the dog and including a tapered section along which the inner dimension decreases as the cavity extends inboard along the X axis, each dog comprising a base extending generally in an X-Z plane and first and second side walls extending along the Y axis from the base, the first and second side walls being spaced apart along the Z axis, each grip further comprising a clamp for clamping the first end portion of the specimen along the X axis against the angled sections of the first and second side walls, wherein each grip comprises an outboard end wall and wherein each clamp comprises a set screw threadably connected to the respective outboard end wall, and
 a drive mechanism configured to move the first grip away from the second grip to stretch the specimen lengthwise;
 wherein the first grip and the second grip are configured to maintain a grip on the specimen as cross-sectional area of the specimen decreases during stretching.

16. A strain testing rig for testing an elongate specimen having a first end portion and a second end portion spaced apart along a specimen axis and a length extending from the first end portion to the second end portion along the specimen axis, the strain testing rig comprising:
 a first support including a first brace plate;
 a second support including a second brace plate;
 a first grip mounted on the first support for gripping the first end portion of the specimen, the first grip comprising a dog having an inboard end portion and an outboard end portion spaced apart along a longitudinal X axis, the dog being configured so that the X axis is parallel to a longitudinal axis of the specimen, the dog comprising a base extending generally parallel to the X axis, and first and second side walls extending generally perpendicular to the base, wherein the first brace plate of the first support and the base of the dog of the first grip are positioned to engage opposite sides of the specimen;
 a second grip mounted on the second support for gripping the second end portion of the specimen; and
 a drive mechanism configured to move the first grip away from the second grip to stretch the specimen lengthwise;
 wherein each of the first grip and the second grip comprises a press for compressing the respective end portion of the specimen, each press comprising a linear actuator and a press plate, the linear actuator being configured to drive the press plate to compress the respective end portion of the specimen.

17. A strain testing rig for testing an elongate specimen having a first end portion and a second end portion spaced apart along a specimen axis and a length extending from the first end portion to the second end portion along the specimen axis, the strain testing rig comprising:
 a first grip for gripping the first end portion of the specimen;
 a second grip for gripping the second end portion of the specimen; and
 a drive mechanism configured to move the first grip away from the second grip to stretch the specimen lengthwise;

wherein each of the first grip and the second grip comprises a clamp for clamping the respective end portion of the specimen along an X axis parallel to the specimen axis and a press for compressing the respective end portion of the specimen along a Y axis perpendicular to the X axis, the press comprising a linear actuator, a press plate and a linkage operatively connecting the linear actuator to the press plate, the linkage comprising a link pivotably connected to the linear actuator and the press plate being pivotably connected to the link.

* * * * *